United States Patent Office 3,632,579
Patented Jan. 4, 1972

3,632,579
THIETANO[3,2-a]INDAN-1,1-DIOXIDES
Milton Wolf, Chester, Pa., assignor to American Home Products Corporation, New York, N.Y.
No Drawing. Filed Dec. 12, 1968, Ser. No. 783,421
Int. Cl. C07d 87/46
U.S. Cl. 260—247.1                        3 Claims

ABSTRACT OF THE DISCLOSURE 2a-amino- or nitrogen-containing heterocyclic-thietano-[3,2-a]indan-1,1-dioxides are prepared having pharmacological activity.

---

This invention relates to novel indane derivatives and more particularly to thietano[3,2-a]indanes and their preparation.

The compounds of the invention fall within the scope of the illustrative structural formula:

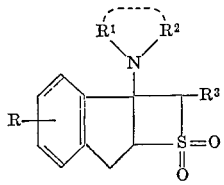

In the formula, the radical R is intended to stand for hydrogen, a lower alkyl, a lower alkoxy, halogen, nitro, or an amino radical. The symbols $R^1$ and $R^2$ are each intended to represent lower alkyls and when connected as shown by the dotted lines, represent, together with N, a nitrogen-containing heterocyclic radical, specifically morpholino, pyrrolidino, piperidino, or N-methylpiperazino. The symbol $R^3$ represents hydrogen, phenyl, or a lower alkyl radical.

The term "lower" alkyl or "lower" alkoxy is intended here to mean alkyl or alkoxy radicals of 1 to 4 carbon atoms with preference, however, to radicals of 1 to 2 carbon atoms. With regard to "halogen," chlorine or bromine substituents are preferred.

The compounds are prepared in accordance with the following reaction scheme:

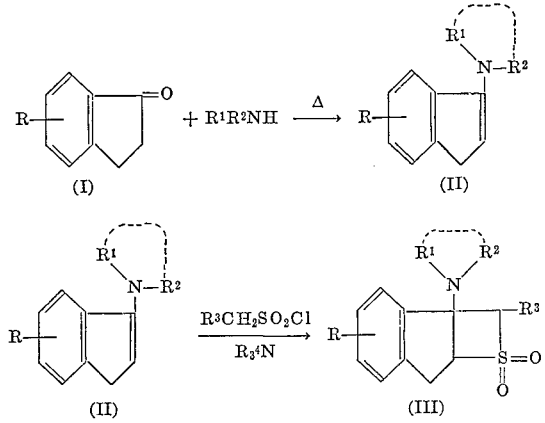

As shown in the above flow-path, R, $R^1$, $R^2$, and $R^3$ have the meanings previously assigned except that R is not amino during the reaction stages indicated. Where R is desired to represent an amino radical, the final compound III, with R representing nitro is reduced by known procedures to an amino radical. The symbol $R^4$ is intended to represent a lower alkyl, preferably ethyl or isopropyl. In the reaction flow-path as shown, a selected 1-indanone (I) is reacted with a lower alkyl secondary amine or an equivalent heterocyclic compound, such as morpholine, pyrrolidine, piperidine, or N-methylpiperazine.

The reaction is carried out in an organic solvent, preferably a benzenoid, at refluxing temperatures for a number of hours until water formation ceases. A catalytic amount of p-toluenesulfonic acid is preferred in the reaction mixture. The product formed is an enamine, more specifically a 1-amino or hetero-substituted indene (II).

The enamine formed is now reacted with a lower alkyl sulfonyl halide, for example, methylsulfonyl chloride in the presence of a lower alkyl tertiary amine with an inert organic solvent, for example, dioxane. The reaction is carried out at room temperature, preferably in the absence of oxygen. The reaction produces a tricyclic ring system (III) identified analytically and spectrally as a 2a-substituted thietano[3,2-a]indan-1,1-dioxide.

Pharmacological evaluation procedures carried out by scientifically acceptable laboratory methods using mice and rats as the test animals indicate the compounds of the invention to be useful in experimental and comparative pharmacology. Specifically, they were found to be central nervous system depressants and useful as quieting or sedative agents when administered to mice orally or parenterally in a single dose in the range of about 40 to 127 mg./kg. of body weight. It may be noted that animals were given up to 400 mg./kg. without lethal effects.

A separate set of experiments indicated significant pharmacological activity in the standard test animal (rats) as anti-inflammatory agents, the test procedure used being that suggested by Winter et al., Proc. Soc. Exp. Biol. and Med. 111: 544, 1962, the procedure assessing the ability to inhibit experimentally induced edema in the hind-paw of the rat. Under the indicated procedure, anti-inflammatory effects were noted in test animals at a dose of 50 mg./kg.

The compounds may be used in basic form or, more preferably, in the form of acid-addition salts. These are prepared in known manner, for example, by reacting the base with the selected acid in an inert organic medium. Typical acids which form pharmaceutically acceptable acid-addition salts are such inorganic acids as the hydrogen halides, for example, hydrogen chloride, or other acids such as phosphoric or sulfuric acids. If organic acid salts are desired typical acids such as acetic, tartaric, fumaric, or maleic acids are effective.

In use, the compounds may be composited in solid form for oral administration, generally with an inert carrier or diluent such as lactose, talc, or other innocuous substances. Where parenteral administration is contemplated, the compounds may be suspended or dissolved in an aqueous or oleaginous carrier.

The following procedures are illustrative of the preparation of typical compounds falling within the scope of the invention.

EXAMPLE 1

Preparation of a 1-substituted indene
1-morpholinoindene

A mixture of 1-indanone (24.0 g., 0.182 m.) and morpholine (26.1 g., 0.30 m.) in benzene (100 ml.) containing a catalytic amount of p-toluenesulfonic acid is refluxed for seventeen hours over a Dean-Stark trap. Morpholine (26.1 g.) and p-toluenesulfonic acid (catalytic amount) is added at this point, and refluxing continued until water ceases to form. The benzene is distilled in vacuo and the residual amber oil distilled in vacuo (2×), affording a pale yellow oil (12.35 g.) B.P. 107–9°/0.1–0.2 mm., M.P. 41.5–42.5° (uncorr).

*Analysis.*—Calcd. for $C_{13}H_{15}NO$ (percent): N, 6.96. Found (percent: N, 6.72.

In place of the morpholine reactant, corresponding enamines may be prepared in accordance with Example 1, starting with dimethylamine, diethylamine, pyrrolidine, piperidine, or N-substituted piperazine. Additionally, instead of using unsubstituted 1-indanone as the starting reactant, substituted indanones may be used, for example, 4-methyl-1-indanone, 6-ethyl-1-indanone, 6-methoxy-1-indanone, 4- or 6-chloro-1-indanone, 4-bromo-1-indanone, or 4-nitro-1-indanone.

EXAMPLE 2

Preparation of a 2a-substituted thietanoindane 2-a-morpholinoethietano[3,2-a]indan-1,1-dioxide A solution of methanesulfonyl chloride (6.88 g., 0.060 m.) in dioxane (25 ml.) is added dropwise with stirring to a solution of 1-morpholinoindene (12.0 g., 0.0597 m.) in dioxane (50 ml.) containing triethylamine (8.3 ml., 0.060 m.) over a period of forty minutes ($N_2$-atmosphere). After the addition is complete, the mixture is stirred at ambient temperature overnight ($N_2$-atmosphere). The triethylamine hydrochloride which separates is collected by filtration, washed with dioxane and the filtrate concentrated in vacuo affording a thick amber syrup which slowly sets to a solid mass. The crude product is chromatographed on basic alumina (Woelm, Activity 1). After washing with benzene, the product is eluted with benzene-ethyl acetate (4:1) affording 8.59 g., of colorless crystals, M.P. 168.0–169.5° C. (uncorr). A portion is recrystallized for analysis from benzene-cyclohexane, colorless prisms M.P. 170.0–170.5° (uncorr).

*Analysis.*—Calcd. for $C_{14}H_{17}NO_3S$ (percent): C, 60.19; H, 6.13; N, 5.01. Found (percent): C, 60.39; H, 6.27; N, 4.97.

The hydrochloride of the title compound is prepared by passing dry halogen chloride into a solution of the base in tetrahydrofuran. Recrystallization of the crude hydrochloride from 95% ethanol affords colorless prisms, M.P. 197–8° (uncorr).

*Analysis.*—Calcd. for $C_{14}H_{18}ClNO_3S$ (percent): C, 53.24; H, 5.74; N, 4.43; Cl, 11.21. Found (percent): C, 53.20; H, 5.72; N, 4.54; Cl, 10.9.

Replacing the methylsulfonyl halide reactant with ethylsulfonyl chloride and also using 1-morpholinoindene as in Example 2, will result in the formation of a product identified as 2-methyl-2a-morpholinothietano[3,2-a]indan-1,1-dioxide. Likewise, as another example, and following the procedure of Example 2, reacting butylsulfonyl chloride or bromide with 6-methoxy-1-piperidinoindene will produce the compound 5-methoxy-2-propyl-2a-piperidinothietano[3,2-a]indan-1,1-dioxide. Likewise, following the molar proportions and conditions of Example 2, but reacting 6-chloro-1-pyrrolidinoindene with benzylsulfonyl chloride will produce the compound 5-chloro-2-phenyl-2a-pyrrolidinothietano[3,2-a]indan-1,1-oxide. Other thietanoindanes may be produced by following the above procedures and using the reactants suggested for the various meanings represented above for R, $R^1$, $R^2$, $R^3$, and $R^4$.

The invention that is claimed is:

1. A compound selected from the group consisting of a base having the formula:

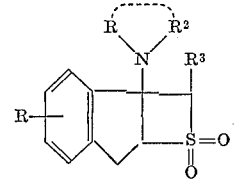

in which R is selected from the group consisting of hydrogen, chlorine, bromine, and lower alkyl of 1 to 2 carbon atoms; $R^1$ and $R^2$ are each lower alkyl of 1 to 2 carbon atoms or together with the nitrogen atoms from morpholino, pyrrolidino, and piperidino; $R^3$ is a member selected from the group consisting of hydrogen and lower alkyl of 1 to 2 carbon atoms; and pharmaceutically acceptable acid addition salts thereof.

2. A compound of claim 1, in which R and $R^3$ are each hydrogen and

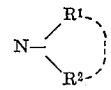

represents morpholino, which is 2a-morpholinothietano[3,2-a]indan-1,1-dioxide.

3. A compound as in claim 2, which is 2a-morpholinothietano[3,2-a]indan-1,1-dioxide, hydrochloride.

References Cited

UNITED STATES PATENTS 3,502,664  3/1970  Paquette _____ 260—247.1

ALEX MAZEL, Primary Examiner

J. TOVAR, Assistant Examiner

U.S. Cl. X.R.

260—293.4 C, 326.82, 327 R; 424—248